United States Patent
Fandl et al.

(10) Patent No.: US 10,428,848 B2
(45) Date of Patent: Oct. 1, 2019

(54) ROTATABLE CONNECTION

(71) Applicant: MAGNA STEYR Engineering AG & Co KG, Graz (AT)

(72) Inventors: Erwin Fandl, Gleisdorf (AT); Franz Mayr, St. Marein bei Graz (AT)

(73) Assignee: MAGNA STEYR Fahrzeugtechnik AG & CO KG, Graz (AT)

( * ) Notice: Subject to any disclaimer, the term of this patent is extended or adjusted under 35 U.S.C. 154(b) by 379 days.

(21) Appl. No.: 15/371,899

(22) Filed: Dec. 7, 2016

(65) Prior Publication Data

US 2017/0089372 A1 Mar. 30, 2017

Related U.S. Application Data

(62) Division of application No. 14/444,936, filed on Jul. 28, 2014, now Pat. No. 10,151,335.

(30) Foreign Application Priority Data

Jul. 29, 2013 (EP) .................................. 13178344

(51) Int. Cl.
*F16B 5/08* (2006.01)
*B23K 31/02* (2006.01)
*F16C 11/04* (2006.01)
*B23K 101/00* (2006.01)
*F16C 11/02* (2006.01)

(52) U.S. Cl.
CPC ................ *F16B 5/08* (2013.01); *B23K 31/02* (2013.01); *F16C 11/04* (2013.01); *F16C 11/045* (2013.01); *B23K 2101/00* (2018.08); *F16C 11/02* (2013.01); *F16C 2226/36* (2013.01); *Y10T 403/32951* (2015.01)

(58) Field of Classification Search
CPC .. F16B 5/08; F16C 11/045; Y10T 403/32861; Y10T 403/32951; Y10T 403/32959; Y10T 403/32918; Y10T 403/32926
See application file for complete search history.

(56) References Cited

U.S. PATENT DOCUMENTS

| 2,327,924 | A | * | 8/1943 | Mounts | .................... B25G 3/26 219/94 |
| 2,422,327 | A |   | 6/1947 | Winslow | |
| 2,527,479 | A |   | 10/1950 | Hall | |
| 2,556,649 | A |   | 6/1951 | Scheeler | |
| 2,939,214 | A | * | 6/1960 | Andersson | .............. A61B 17/00 29/525.14 |

(Continued)

FOREIGN PATENT DOCUMENTS

| DE | 1034421 B | 7/1958 |
| DE | 3210310 A1 | 9/1983 |

(Continued)

*Primary Examiner* — Michael P Ferguson
(74) *Attorney, Agent, or Firm* — Jordan IP Law, LLC; Todd A. Vaughn

(57) ABSTRACT

A rotatable connection between a first component and a second component, the rotatable connection comprising: a first connecting piece composed of metal and which is to penetrate the first component over at least the entire thickness of the first component, in which at an end facing the second component, the first connecting piece is welded to the second component.

3 Claims, 3 Drawing Sheets

(56) References Cited

U.S. PATENT DOCUMENTS

| | | | |
|---|---|---|---|
| 3,108,500 A | | 10/1963 | Merriman |
| 3,459,187 A | | 8/1969 | Pallotta |
| 3,911,766 A | | 10/1975 | Fridolph et al. |
| 4,192,622 A | | 3/1980 | Stecklein |
| 4,290,545 A | * | 9/1981 | Whitney ................. B02C 13/28 228/139 |
| 4,834,569 A | | 5/1989 | Foote et al. |
| 5,220,856 A | | 6/1993 | Eggert et al. |
| 5,228,795 A | | 7/1993 | Gray |
| 5,649,781 A | | 7/1997 | O'Boyle |
| 6,227,433 B1 | | 5/2001 | Waldron et al. |
| 6,736,942 B2 | | 5/2004 | Weihs |
| 8,556,531 B1 | | 10/2013 | Bird et al. |
| 2011/0097142 A1 | | 4/2011 | Bassler et al. |

FOREIGN PATENT DOCUMENTS

| | | |
|---|---|---|
| DE | 102011106700 A1 | 3/2012 |
| EP | 0967044 A2 | 12/1999 |

* cited by examiner

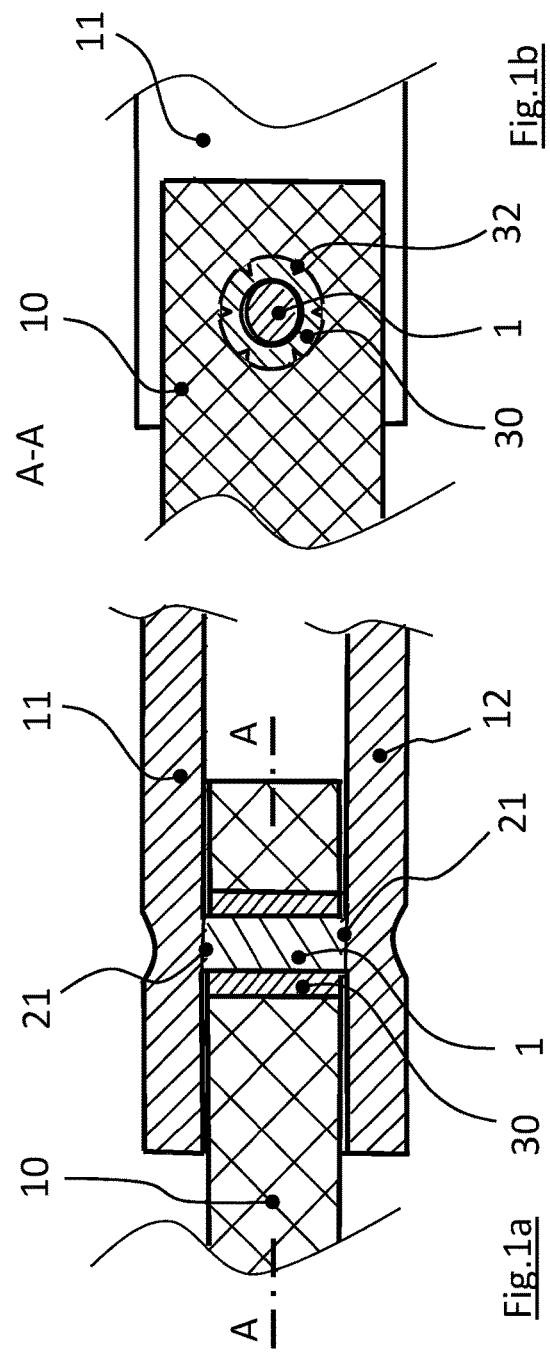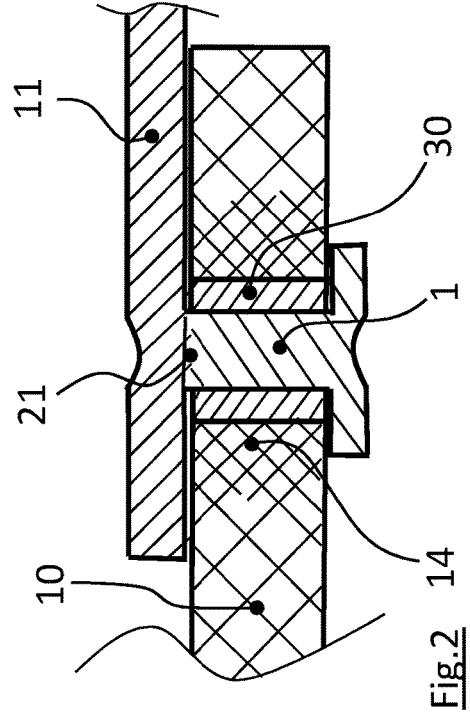

ROTATABLE CONNECTION

CROSS-REFERENCE TO RELATED APPLICATIONS

The present application is a divisional of U.S. patent application Ser. No. 14/444,936, which claims priority under 35 U.S.C. § 119 to European Patent Publication No. EP 13178344.1 (filed on Jul. 29, 2013), which are each hereby incorporated by reference in there complete entireties.

TECHNICAL FIELD

Embodiments relate to a rotatable connection between a first component and a second component, in particular between two plates or shaped parts. The first component is thus rotatable relative to the second component.

Embodiments relate to a rotatable connection comprising a first connecting piece made of metal, wherein the first connecting piece penetrates a first component over at least the entire thickness of the first component.

Embodiments further relate to a method for producing such a rotatable connection.

BACKGROUND

Rotatable connections between two components are used in very different fields such as, for example in the automotive industry. Such rotatable connections may be of particular use for producing folding top linkages for convertibles but also, for example, for linkages of foldable wheelchairs or garden shears. Generally, such connections are produced by screwing or riveting the components together.

The rapid manufacture of such rotatable connections by a reliable process is not always possible, depending on the materials used. Producing the connection may lead to damage of the components. In particular, when the components to be connected is composed of different materials, this may also result in corrosion between the materials.

SUMMARY

In accordance with embodiments, a rotatable connection between a first component and a second component may be produced easily and by a reliable process. Such a connection damages the components as little as possible both during production and during use.

In accordance with embodiments, a method for producing such a rotatable connection in a simple manner is provided.

In accordance with embodiments, a rotatable connection between a first component and a second component may comprise at least one of the following: a first connecting piece composed of metal, wherein the first connecting piece is to penetrate the first component over at least the entire thickness of the first component, and the first connecting piece is welded to the second component at an end thereof which faces the second component, or to a second connecting piece made of metal that penetrates the second component.

Thus, in accordance with embodiments the metal connecting piece is not fastened in a complicated manner on the side of the second component by a screw nut or a further connecting part, and also does not have to penetrate the second component. The connecting piece is either directly welded to the second component which may, for example, be a metal plate or a metal shaped part, in particular on the surface of the second component facing the first component. Alternatively, when the second component is composed of a plastic material or fibre composite, the connecting piece is welded to a second metal connecting piece which is incorporated into the second component. In particular, in this case the second connecting piece, if present, is also able to penetrate the second component over its entire thickness.

In accordance with embodiments, the first component is a plate or a shaped part and/or the second component is a plate or shaped part. "Plate" or "shaped part" are to be understood not only as planar parts and/or parts extending substantially in one plane, but also as structural components and/or shaped parts, such as, for example, pressed parts, forged parts and drawn parts or profiled rods or sheet metal shapes or tubes locally crimped or cast shapes and the like.

In accordance with embodiments, the first connecting piece and/or, if present, the second connecting piece, may be configured to be cylindrical, pin-shaped or as a pin with a head. Shapes without a head are particularly suitable for connecting three components, where the first component is welded, on the one hand, to a second component and at the other end of the connecting piece to a third component or, for example, a disc so that the first component is rotatable, in particular, relative to the second and third components. Shapes of the connecting piece comprising a head are in turn particularly suitable for welding on only one side of the connecting piece, wherein the head on the opposing side of the first component is able to bear thereagainst and is able to secure the first component at this end against axial displacement.

In accordance with embodiments, the first component may be composed of a plastic material or fibre composite and may be, in particular, a plastic plate or fibre composite plate.

In accordance with embodiments, the second component is composed of a plastic material, or fibre composite, or metal material, and may be, in particular, a plastic plate, or a fibre composite plate, or a metal plate, for example made of steel, in particular a metal sheet.

In accordance with embodiments, such a rotatable connection may be produced between two plastic or fibre composite plates, but a connection may also be produced between different materials, namely in particular between plastics and/or fibre composite on one side and metal on the other side.

In accordance with embodiments, the welding is carried out by spot welding or even by welding by way of a reactive film.

In accordance with embodiments, the first connecting piece is arranged in a first sleeve and/or the second connecting piece is arranged in a second sleeve or the first connecting piece and the second connecting piece are arranged together in the first sleeve. The sleeve may act as a plain bearing sleeve and may be composed of a material with a low coefficient of friction relative to steel, in particular of brass, polyether ether ketone (PEEK) or ceramics.

In accordance with embodiments, the first sleeve is connected to the first component by a material connection and/or positive connection and/or the second sleeve is connected to the second component by a material connection and/or positive connection. Thus, the first connecting piece may, for example, be rotatably mounted in the first sleeve which in turn is connected fixedly to the first component.

In accordance with embodiments, the first sleeve and/or the second sleeve has shaped portions, in particular recesses, distributed over a periphery thereof. As a result, by way of the positive connection, the resistance to twisting under load of the sleeve relative to the component may be increased.

In accordance with embodiments, in addition to the first component, further components, in particular further plates or shaped parts, may be arranged on the first connecting piece so that over at least the entire thickness of the first component and the further components the first connecting piece penetrates said components, so that the first component and the further components and the second component are rotatable relative to one another. The further components act, therefore, as further first components, wherein all first components are rotatably mounted on the first connecting piece. Accordingly, in this case, the first connecting piece may be welded at both ends to a metal sheet.

In accordance with embodiments, the first connecting piece is designed to be cylindrical or pin-shaped and at one end is welded to the second component and at the opposing end is welded to a third component, in particular at one or at both ends to a metal sheet.

In accordance with embodiments, the first connecting piece is designed as a pin with a head and, at the end at which the connecting piece does not have a head, is welded to a metal sheet.

In accordance with embodiments, the first connecting piece is designed as a pin with a head and, at the end at which the first connecting piece has no head, is welded to a second connecting piece which is designed as a pin with a head, at the end thereof which has no head. The respective ends without a head of two connecting pieces are in this case welded together and the heads thereof axially secure two components which are rotatable relative to one another. In this case, the second connecting piece may penetrate the entire second component.

In accordance with embodiments, a method for producing a rotatable connection may comprise at least one of the following: placing a first connecting piece being through a first component and then welding the first connecting piece at its end facing the second component to a second component or to a second connecting piece made of metal penetrating the second component.

In accordance with embodiments, the welding takes place by spot welding or by welding by way of a reactive film.

In accordance with embodiments, initially a first sleeve is connected to the first component by a material connection and/or positive connection. The sleeve may, for example, be pressed into the first component or during production of the first component already integrated therein, in particular by being interwoven into the first component. The first connecting piece is subsequently placed through the first component by the first connecting piece being arranged in the first sleeve, i.e., guided through the sleeve. Subsequently, the connecting piece is welded again.

DRAWINGS

Embodiments will be illustrated by way of example in the drawings and explained in the description below.

FIG. 1a illustrates a side view of a rotatable connection between a first component and a second component, in accordance with embodiments.

FIG. 1b illustrates a sectional view along A-A of FIG. 1a of a rotatable connection between a first component and a second component, in accordance with embodiments.

FIG. 2 illustrates a side view of a rotatable connection between a first component and a second component, in accordance with embodiments.

DESCRIPTION

Figure 3:
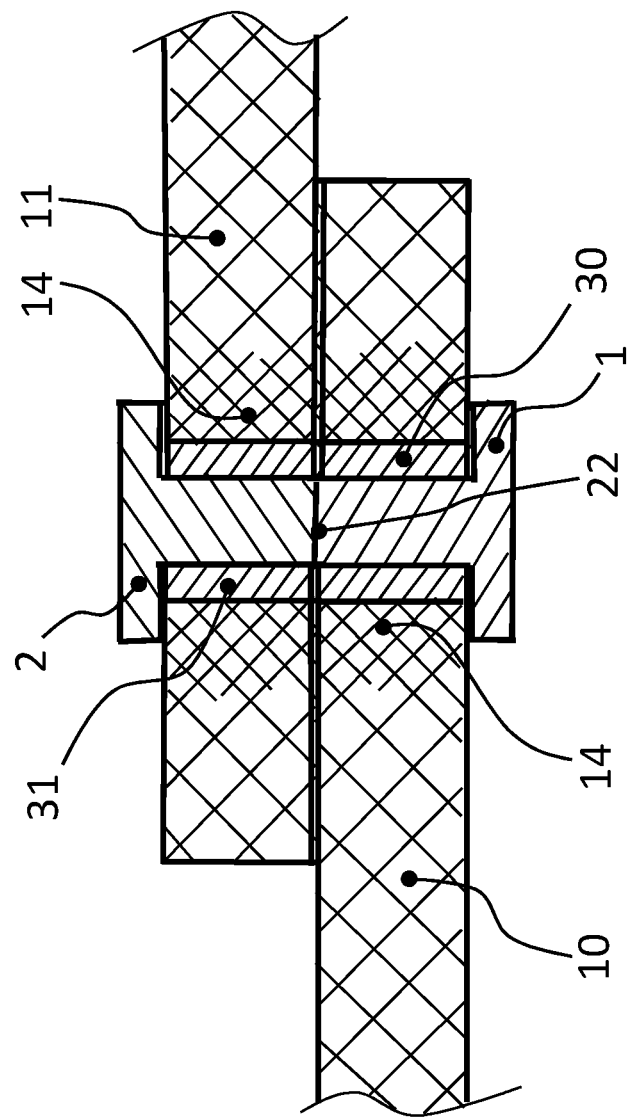
FIG. 3 illustrates a side view of a rotatable connection between a first component and a second component, in accordance with embodiments.

As illustrated in FIGS. 1a and 1b, a rotatable connection in accordance with the invention between a first component 10 composed of plastics or fibre composite, and a second component 11 formed by a metal sheet is provided. The connection comprises a first cylindrical or pin-shaped connecting piece 1 made of metal, in which the first connecting piece 1 penetrates the first component 10 over the entire thickness of the first component 10. The first connecting piece 1 is welded at its end facing the second component 11 to the second component 11 in the welding zone 21 on the surface of the second component 11 by spot welding. The first connecting piece 1 is also welded at its end remote from the second component 11 to a third component 12, for example, a plate or a shaped part, also in a welding zone 21. The connecting piece 1 is arranged in a first sleeve 30 which is connected fixedly in terms of rotation to the first component 10 and acts as a plain bearing sleeve. The first sleeve 30 is designed to be slightly shorter in length than the connecting piece 1 in order to prevent jamming of the connected components.

As illustrated in FIG. 1b, the first sleeve 30 has recesses 32 on its external diameter in order to ensure security against twisting relative to the first component 10.

Figure 4:
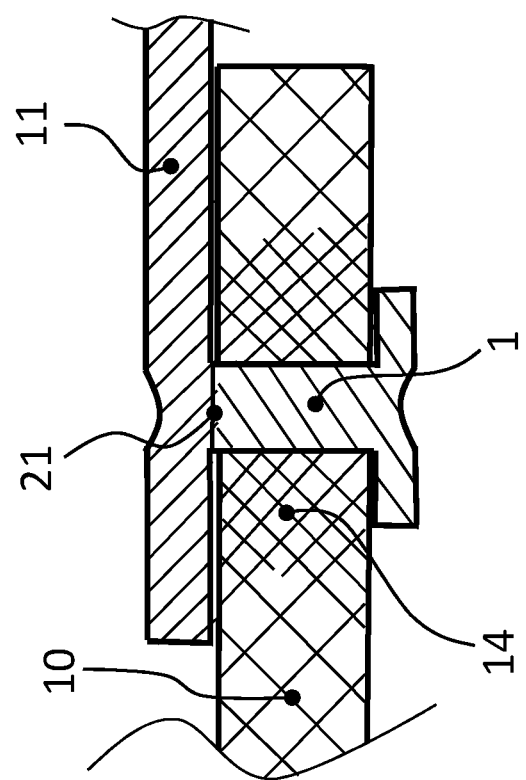
FIG. 4 illustrates a side view of a rotatable connection between a first component and a second component, in accordance with embodiments.

As illustrated in FIG. 2, the first component 10 is rotatably connected to a second component 11 on only one side. The first connecting piece 1 is designed as a pin with a head and is welded at the end at which the connecting piece 1 has no head, in the welding zone 21, to a metal sheet of the second component 11. The connecting piece 1 in this embodiment is also mounted in a first sleeve 30. In contrast thereto, the embodiment in accordance with FIG. 4 which may be used with materials which are less critical in terms of corrosion and wear, and which in other respects is the same embodiment as in FIG. 2, has no sleeve 30, wherein preferably the opening in the first component 10 provided for receiving the connecting piece 1 is already produced during the production process of the first component 10 in order to obtain a high degree of strength in this region, such as for example by compaction 14 of the fibres. Particularly, however, a first sleeve 30, as illustrated in FIG. 2, is interwoven into the first component 10 which is designed as a fibre composite plate, wherein a compaction 14 of the fibres is produced in the region around the first sleeve 30, by which the strength is increased in the surroundings of the joint.

As illustrated in FIG. 3, the first connecting piece 1 is designed as a pin with a head and, at the end at which the first connecting piece 1 has no head, is welded to a second connecting piece 2 designed as pin with a head, and namely at the end of the second connecting piece 2 which also has no head. The welding in the welding zone 22 takes place by way of a reactive film. The first connecting piece 1 is mounted via a first sleeve 30 in the first component 10 and the second connecting piece 2 is mounted via a second sleeve 31 in the second component 11. The first and second components 10, 11 are in this case designed as plastics or fibre composite plates and are rotatable relative to one another. In a further embodiment, the second sleeve 31 may also be dispensed with and thus the first sleeve 30 designed to be longer, so that it passes through the first and second components 10, 11. Also in this case, the first and/or the second sleeve 30, 31 may be designed to be slightly shorter than the connecting pieces 1, 2 in order to prevent jamming of the connected components.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 First connecting piece
2 Second connecting
10 First component
11 Second component
12 Third component
14 Compaction
21 Welding zone
22 Welding zone
30 First sleeve
31 Second sleeve
32 Recess

What is claimed is:

1. A rotatable connection, comprising:
a first component, having a plate-shape, and composed of a fibre reinforced plastic material;
a second component, having a plate-shape, and composed of a fibre-reinforced plastic material, the second component being disposed parallel to the first component;
a bearing sleeve, mounted within and interwoven into the first component such that a compaction of fibres of the fibre reinforced plastic material is produced in a region around the bearing sleeve, the bearing sleeve having shaped portions distributed over a periphery thereof in which the fibres are compacted to thereby form a positive material connection to increase resistance to twisting under load between the bearing sleeve and the first component;
a first cylindrical pin-shaped connecting piece composed of metal, coaxially and rotatably extending through the bearing sleeve and the first component to define a first rotational axis;
a second cylindrical pin-shaped connecting piece composed of metal, coaxially and rotatably extending through the second component to define a second rotational axis that is coaxial to the first rotational axis;
a weld connection connecting the first cylindrical pin-shape connecting piece and the second cylindrical pin-shaped connecting piece at a welding zone disposed between opposing distal ends of the first and second connecting pieces via a reactive film, and thereby forming a unitary bearing pin about which the first component and the second component are to rotate relative to each other.

2. A rotatable connection, comprising:
a first component, composed of a fibre reinforced plastic material;
a second component, composed of a fibre reinforced plastic material, the second component being disposed parallel to the first component;
a first cylindrical pin-shaped connecting piece, composed of metal, coaxially and rotatably extending through the first component over at least the entire thickness of the first component to define a first rotational axis;
a second cylindrical pin-shaped connecting piece, composed of metal, coaxially and rotatably extending through the second component over at least the entire thickness of the second component to define a second rotational axis that is coaxial to the first rotational axis; and
a weld connection connecting the first cylindrical pin-shaped connecting piece and the second cylindrical pin-shaped connecting piece, at a welding zone disposed between opposing distal ends of the first and second connecting pieces via a reactive film, and thereby forming a unitary bearing pin about which the first component and the second component are to rotate relative to each other;
a first bearing sleeve, mounted within the first component and through which the first connecting piece coaxially and rotatably extends, the first bearing sleeve being integrated into the first component so as to be interwoven into the first component such that a compaction of fibres of the fibre reinforced plastic material is produced in a region around the first bearing sleeve, the first bearing sleeve having shaped portions distributed over a periphery thereof in which the fibres are compacted to thereby form a positive material connection to increase resistance to twisting under load of the first bearing sleeve relative to the first component; and
a second bearing sleeve, mounted within the second component and through which the second connecting piece coaxially and rotatably extends, the second bearing sleeve being integrated into the second component so as to be interwoven into the second component such that a compaction of fibres of the fibre reinforced plastic material is produced in a region around the second bearing sleeve, the second bearing sleeve having shaped portions distributed over a periphery thereof in which the fibres are compacted to thereby form a positive material connection to increase resistance to twisting under load of the second bearing sleeve relative to the second component.

3. A rotatable connection, comprising:
a first component, having a plate-shape, and composed of a fibre reinforced plastic material;
a second component, having a plate-shape, and composed of a fibre-reinforced plastic material, the second component being disposed parallel to the first component;
a first connecting piece, having a cylindrical pin-shape, and composed of metal, coaxially and rotatably extending through the first component over at least the entire thickness of the first component to define a first rotational axis;
a second connecting piece, having a cylindrical pin-shape, and composed of metal, coaxially and rotatably extending through the second component over at least the entire thickness of the second component to define a second rotational axis that is coaxial to the first rotational axis;
a first bearing sleeve mounted within the first component and through which the first connecting piece coaxially and rotatably extends, the first bearing sleeve being interwoven and integrated into the first component such that a compaction of fibres of the fibre reinforced plastic material is produced, the first bearing sleeve including shaped portions distributed over a periphery thereof in which the fibres are compacted to thereby form a positive material connection to increase resistance to twisting under load of the first bearing sleeve relative to the first component; and a second bearing sleeve mounted within the second component and through which the second connecting piece coaxially and rotatably extends, the second bearing sleeve being interwoven and integrated into the second component such that a compaction of fibres of the fibre reinforced plastic material is produced, the second bearing sleeve including shaped portions distributed over a periphery thereof in which the fibres are compacted to thereby form a positive material connection to increase resistance to twisting under load of the second bearing sleeve relative to the second component; and a weld connection connecting the first connecting piece and the second connecting piece at a welding zone disposed between opposing distal ends of the first and second connecting pieces via a reactive film, such that the first component and the second component are to rotate relative to each other.

* * * * *